United States Patent
Gerlach et al.

[11] Patent Number: 5,955,255
[45] Date of Patent: *Sep. 21, 1999

[54] SOUND RECORDING FILM

[75] Inventors: Steven Mark Gerlach, Fairport; Gregory Edward Farrell, Rochester, both of N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/699,876

[22] Filed: Aug. 20, 1996

Related U.S. Application Data

[60] Provisional application No. 60/005,708, Oct. 20, 1995.

[51] Int. Cl.$^6$ .............................. G03C 1/12; G03C 1/29; G03C 5/14; G03C 5/28
[52] U.S. Cl. ..................... 430/572; 430/140; 430/571; 430/934
[58] Field of Search .................... 430/140, 571, 430/572, 934

[56] References Cited

U.S. PATENT DOCUMENTS

| | | | |
|---|---|---|---|
| 1,756,863 | 4/1930 | Hoxie | 96/39 |
| 2,178,217 | 10/1939 | Baker | 430/140 |
| 2,430,588 | 10/1947 | Carroll et al. | 95/7 |
| 3,705,803 | 12/1972 | Bevis et al. | 430/140 |
| 3,715,208 | 2/1973 | Lestina et al. | 430/140 |
| 3,945,824 | 3/1976 | Sakai et al. | 430/140 |
| 3,969,593 | 7/1976 | Vlahos | 179/100.3 K |
| 4,139,382 | 2/1979 | Stephens | 430/140 |
| 4,208,210 | 6/1980 | Sakai et al. | 430/140 |
| 4,216,284 | 8/1980 | Sakai et al. | 430/140 |
| 4,430,422 | 2/1984 | Van de Sande et al. | 430/377 |
| 4,461,552 | 7/1984 | Levine | 352/27 |
| 4,553,833 | 11/1985 | Kanaoka et al. | 355/40 |
| 4,600,280 | 7/1986 | Clark | 352/37 |
| 4,839,267 | 6/1989 | Monbaliu et al. | 430/546 |
| 5,283,164 | 2/1994 | Fenton | 430/934 |
| 5,356,764 | 10/1994 | Szajewski et al. | 430/505 |
| 5,639,585 | 6/1997 | Callahan, Jr. et al. | 430/140 |

FOREIGN PATENT DOCUMENTS

| | | |
|---|---|---|
| 304297 | 2/1989 | European Pat. Off. . |
| 574136 | 12/1993 | European Pat. Off. . |
| 574239 | 12/1993 | European Pat. Off. . |
| 605141 | 7/1994 | European Pat. Off. . |
| 2459927 | 12/1974 | Germany . |
| 230638 | 8/1978 | U.S.S.R. . |
| 430747 | 8/1978 | U.S.S.R. . |
| 93/22710 | 11/1993 | WIPO . |

OTHER PUBLICATIONS

Clerc, *Photography Theory and Practice*, vol. 3 Films, American Photographic Book Publishing Co, New York, 1970, pp. 334–337.

Stroebel & Todd, *Dictionary of Contemporary Photography* Morgan & Morgan Inc, Dobbs Ferry, N.Y., p. 138, 1974.

Eastman Digital Sound Recording Film 2374™, Preliminary Data Sheets, 1990.

*Primary Examiner*—Richard L. Schilling
*Attorney, Agent, or Firm*—Andrew J. Anderson

[57] ABSTRACT

A black and white silver halide motion picture sound recording film is disclosed comprising a support bearing at least one silver halide emulsion layer, wherein said film is spectrally sensitized both above and below 600 nm. Such film may be used for recording multiple optical soundtracks by exposing said film with a first source of radiation having a peak wavelength of less than or equal to 600 nm, recording a second digital soundtrack by exposing said film with a second source of radiation having a peak wavelength of greater than 600 nm, and processing said exposed film to form first and second digital soundtrack silver images.

10 Claims, 1 Drawing Sheet

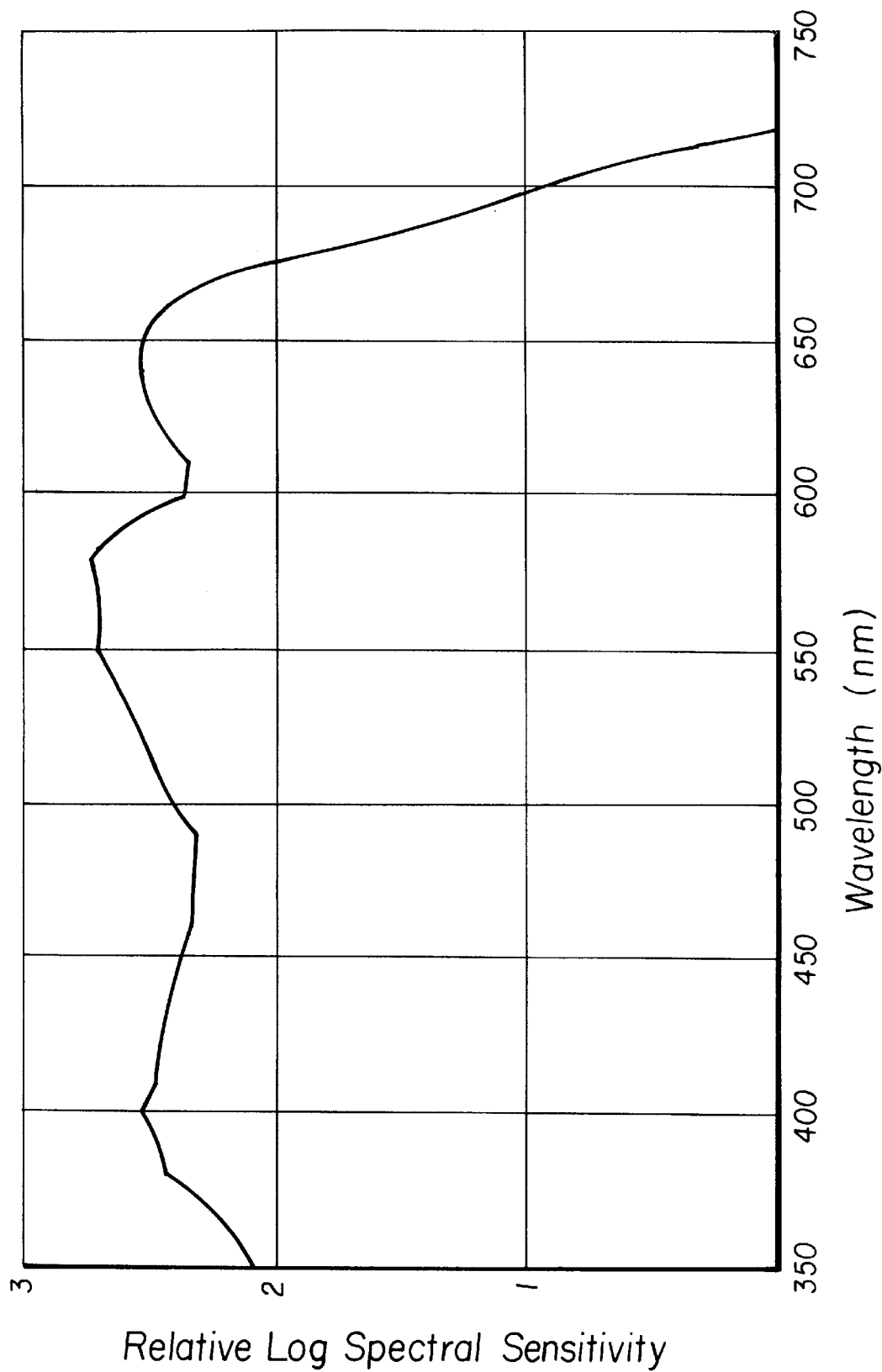
FIG. I

5,955,255

SOUND RECORDING FILM

CROSS REFERENCE TO RELATED APPLICATION

Reference is made to and priority claimed from U.S. provisional application Ser. No. U.S. 60/005,708, filed Oct. 20, 1995, entitled SOUND RECORDING FILM.

TECHNICAL FIELD

This invention relates generally to the field of motion picture films, and in particular to a sound recording film and use thereof in recording analog and digital optical sound tracks on a motion picture film.

BACKGROUND OF THE INVENTION

Motion picture print films, the film that is shown in movie theaters, commonly employ optical soundtracks along at least one edge of the film. The most common optical soundtracks presently in use are analog soundtracks of the "variable area" type wherein signals are recorded in the form of a varying ratio of opaque to relatively clear area along the soundtrack. During projection of the motion picture images, a light source illuminates the soundtrack and a photosensor senses the light passing through and modulated by the soundtrack to produce an audio signal that is sent to amplifiers of the theater sound system.

Digital soundtracks for motion picture films have been more recently introduced, wherein sound information is recorded in a digital format, e.g. comprising small data bit patterns on the film, typically between perforations of the motion picture film (e.g., Dolby™ Digital Stereo soundtracks) or along the film edge (e.g., Sony™ Dynamic Digital Sound soundtracks). U.S. Pat. Nos. 4,600,280 and 4,461,552, e.g., disclose methods in which digital audio is photographically recorded on motion picture film. U.S. Pat. No. 4,553,833 discloses a method for photographic recording of characters and symbols wherein a light emitting diode array is focused through converging lenses to focus small dot patterns on the film. European Patent Publication EP 0 574 239 discloses method and apparatus for photographically recording digital audio signals with error correction capability on more than one channel. European Patent Publication EP 0 574 136 discloses method and apparatus for recording digital information for clocking tracking error detection and correction, digital audio multichannel tracks and analog audio on a film media.

While digital soundtracks offer the advantage of high quality digital sound recording, they require the use of special sound decoding equipment during projection which all movie theaters may not have. Accordingly, conventional analog soundtracks are typically also included on a motion picture print film which is printed with a digital soundtrack so that such print film may be distributed to theaters which do not have equipment capable of decoding the digital soundtrack as well as those that do. Also, as digital soundtracks record information in the form of very small data bits, they may suffer from poor encoding and recording efficiency associated with the high precision demands of the recording process, as well as data loss due to scratches, etc. While various error detection and correction methods have been proposed for such digital soundtracks, analog soundtracks are still nevertheless desirably included on the print films as backups for the digital soundtracks during projection of a film.

In order to optimize the visual quality of the motion picture image as well as the sound quality of the soundtrack recorded on a motion picture print film, the motion picture and soundtrack are first typically captured or recorded on separate photosensitive films as negative images, and the resulting negatives are then printed in synchronization on the motion picture print film to form positive images. On account of the very short exposure times which must be given to each separate picture, or frame, in capturing a motion picture image, a camera negative film employing relatively fast silver halide emulsions is typically used to record the motion picture images (e.g., Eastman Color Negative Films). In order to reproduce the wide ranges of colors and tones which may be found in various images, the camera film typically also has a relatively low contrast or gamma. Variable area analog soundtracks and digital soundtracts, however, are best recorded with high contrast, relatively slow speed black and white films (e.g., Eastman Sound Recording Films) in order to generate desired sharp images for the sound recording and minimize background noise generated by relatively high minimum densities typically associated with relatively fast films.

Typical black and white sound recording films designed for recording analog soundtracks comprise a relatively fine grain (e.g., grain size less than 0.35 micron) monodispersed silver halide emulsion, which provides the high contrast (e.g., contrast overall gradient greater than 3.7) desirable for recording the soundtrack with sharp edges. White light sources such as tungsten lamps have conventionally been used to record analog soundtracks. Accordingly, the inate sensitivity of many silver halide emulsions in the blue region of the electromagnetic spectrum (e.g., 380–500 nm) has been sufficient for such white light recording. Where additional speed is desired for white light recording or where emulsions are used which lack sufficient inate sensitivity in the visible light region, sound recording films have been sensitized for analog recording with blue and/or green sensitizing dyes.

Digital soundtrack recording is typically performed by exposing a sound recording film to a modulated coherent radiation light source having a narrow band width, such as a modulated laser beam or light emitting diode or diode array. Sound recording films have been made which are optimally spectrally sensitized to provide a peak sensitivity to match a particular digital recording device, along with providing adequate sensitivity for recording anolog soundtracks with white light sources.

Exposing devices of varying peak wavelength have been proposed for digital recording in the industry. Light sources having narrow band widths within both the green (e.g. 500–600 nm) and red (e.g. 600–750 nm) regions, e.g., have been proposed for recording digital soundtracks. Sound recording films have been previously introduced which have been spectrally sensitized with a green spectral sensitizing dye designed to provide optimal sensitivity for recording with a 580 nm light source (e.g., Eastman Sound Recording Film EXR 2378) or with a red spectral sensitizing dye designed to provide optimal sensitivity for recording with a coherent radiation light source providing peak wavelength of about 670 nm (e.g., Eastman Digital Sound Recording Film 2374). Such films allow for both a particular digital as well as an anolog soundtrack to be recorded on a single sound recording film, which can then be printed on a motion picture print film. However, and in order to record separate digital soundtracks having acceptable densities with each of the previously proposed light sources, it is currently necessary to record such soundtracks on separate sound recording films, and then to print both soundtracks onto the print film from the separate negatives. This is a labor intensive process requiring the use of multiple sound recording films and synchronization of the sound negatives to the motion picture. It would be desirable to be able to record multiple digital soundtracks with light sources having peak wavelengths in the green and red regions on a single sound recording film.

SUMMARY OF THE INVENTION

In accordance with one embodiment of the invention, a black and white silver halide motion picture sound recording film is disclosed comprising a support bearing at least one silver halide emulsion layer, wherein said film is spectrally sensitized both above and below 600 nm.

In accordance with a second embodiment of the invention, a method for recording multiple optical soundtracks in a black and white silver halide motion picture sound recording film is disclosed comprising recording a first digital soundtrack by exposing said film with a first source of radiation having a peak wavelength of less than or equal to 600 nm, recording a second digital soundtrack by exposing said film with a second source of radiation having a peak wavelength of greater than 600 nm, and processing said exposed film to form first and second digital soundtrack silver images, wherein said film is spectrally sensitized both above and below 600 nm.

BRIEF DESCRIPTION OF THE DRAWINGS

FIG. 1 illustrates the relative spectral sensitivity of a film in accordance with the invention over the visible spectrum.

DETAILED DESCRIPTION

In the following discussion of suitable materials for use in the sound recording films and sound recording methods of this invention, reference will be made to *Research Disclosure*, December 1978, Item 17643, and *Research Disclosure*, December 1989, Item No. 308119, both published by Kenneth Mason Publications, Ltd., Dudley Annex, 12a North Street, Emsworth, Hampshire PO10 7DQ, ENGLAND, the disclosures of which are incorporated herein by reference. These publications will be identified hereafter by the term "Research Disclosure." A reference to a particular section in "Research Disclosure" corresponds to the appropriate section in each of the above-identified *Research Disclosures*. The elements of the invention can comprise emulsions and addenda described in these publications and publications referenced in these publications.

Motion picture sound recording films typically comprise at least one black and white silver halide emulsion layer coated on a transparent support. The silver halide emulsion layers may include any type of silver halide grains. Such grains can be comprised of, e.g., silver bromide, silver chloride, silver iodide, silver bromochloride, silver bromoiodide, silver iodochloride, silver iodobromide, silver chlorobromoiodide or mixtures thereof; and can be of various shapes and size. In order to provide a high contrast film (e.g., contrast overall gradients preferably greater than 3.7, more preferably greater than 3.8, most preferably greater than 3.9) wherein the overall gradient is defined as the slope of the straight line portion of a D logE characteristic curve between 0.3 and 2.3 above minimum density), sound recording film cubical emulsion layers typically comprise fine monodisperse silver halide grains having a coefficient of variation ("C.O.V.") of grain diameter of less than 55%, preferably less than 45% and most preferably less than 35%, wherein C.O.V. is defined as the standard deviation (sigma) of grain diameter for the emulsion divided by the mean grain diameter, times 100. Silver laydowns in the emulsion layers should be sufficient to provide maximum densities of at least 3.4, preferably at least 3.6.

According to common analog soundtrack recording procedures, sound recording films are exposed to tungsten light in a sound recorder to capture the latent image of an anolog sound pattern. The typical equivalent shutter speeds of commercial analog soundtrack recorders are on the order of $10^{-3}$ second exposure time. Typical digital recording exposure times using lasers or light emitting diodes range from $10^{-3}$ second to $10^{-4}$ second or less. In order to enable efficient capture of both analog soundtracks recorded with tungsten light as well as digital soundtracks, in a preferred embodiment of the invention emulsions having a reciprocity speed differential of less than 0.25 logE, more preferably less than 0.2 logE, and most preferably less than 0.1 logE over a range of exposure times from 10-3 to 10-4 second, wherein the reciprocity speed differential is measured at a density of 2.5. Reciprocity performance may be achieved using known techniques such as through use of dopants and/or chemical sensitization.

Dopants, such as compounds of copper, thallium, lead, bismuth, cadmium and Group VIII noble metals, can be present during preparation of silver halide grains employed in emulsion layers of the sound recording film. Possible dopants also include transition metal complexes as described in U.S. Pat. Nos. 4,981,781, 4,937,180, and 4,933,272.

Emulsions can be surface-sensitive emulsions, i.e., emulsions that form latent images primarily on the surface of the silver halide grains; or internal latent image-forming emulsions, i.e., emulsions that form latent images predominantly in the interior of the silver halide grains. The emulsions are preferably negative-working emulsions such as surface-sensitive emulsions or unfogged internal latent image-forming emulsions.

The silver halide grains of the emulsions can further be surface-sensitized, and noble metal (e.g., gold), middle chalcogen (e.g., sulfur, selenium, or tellurium) and reduction sensitizers, employed individually or in combination, are specifically contemplated. Typical chemical sensitizers are listed in *Research Disclosure*, Item 308119, cited above, Section III.

Silver halide emulsions can be spectrally sensitized with dyes from a variety of classes, including the polymethine dye class, which includes the cyanines, merocyanines, complex cyanines and merocyanines (i.e., tri-tetra-, and polynuclear cyanines and merocyanines), oxonols, hemioxonols, styryls, merostyryls, and streptocyanines. Illustrative spectral sensitizing dyes are disclosed in U.S. Pat. No. 2,430,558 and other references cited in *Research Disclosure*, Item 308119, cited above, Section IV. In accordance with the invention, the sound recording film emulsions are effectively spectrally sensitized both below and above 600 nm. This may be accomplished with a sensitizing dye providing a broad sensitivity peak for the sensitized emulsion which spans substantial portions of both the green (e.g., 500–600 nm) and red (e.g., 600–750) regions of the spectrum, or through use of multiple sensitizing dyes providing peak sensitivities both above and below 600 nm. In a preferred embodiment, the sound recording film emulsions are spectrally sensitized with a first green spectral sensitizing dye providing a peak sensitivity at less than or equal to 600 nm and a second red spectral sensitizing dye providing a peak sensitivity above 600 nm. Such first and second dyes are preferably used together to spectrally sensitize a single silver halide emulsion, but may alternatively be used to sensitize separate emulsions, which may then be combined and coated in a single layer or coated in separate layers.

In a preferred embodiment of the invention, the sound recording film is spectrally sensitized with green and red spectral sensitizing dyes providing peak sensitivities at about 580 nm and at about 670 nm. In further embodiments of the invention, the sound recording film may also be sensitized to the infrared and/or ultraviolet regions of the electromagnetic spectrum.

The sound recording film of the invention is preferably spectrally sensitized so as to require less than 0.23 erg/cm$^2$, more preferably less than 0.21 erg/cm$^2$, and most preferably less than 0.2 erg/cm$^2$ of energy at wavelengths of 580 nm and 670 nm, and more preferably for all wavelengths throughout the green and red regions of the electromagnetic spectrum, to produce a visual density of 0.40 after exposure and standard processing in the D-97 process as specified in the Kodak Publication H-24 titles "Manual for processing Eastman Motion Picture Film Module 15", the disclosre of which is incorporated by reference. As disclosed therein, standard processing steps for processing black and white films with Kodak D-97 Developer comprise development, wash or stop, and fix steps. The development step is especially important to the control of contrast and image density. Standard development times are disclosed as being dependent on type of film being processed. As disclosed in the Examples below, standard development time for processing black and white sound recording films with Kodak D-97 Developer is 4:00 minutes at 23.9±0.3° C. The composition of the standard D-97 Developer formulation, as set forth in Table 15-6 of Kodak Publication H-24, is as follows:

| KODAK Developer D-97 (Positive) | | |
|---|---|---|
| Constituent | D-97 (tank) | D-97R (replenisher) |
| Water, about 125° F. (50° C.) | 750 mL | 750 mL |
| Quadrofos or Calgon* | 1.0 g** | 1.0 g** |
| KODAK ELON Developing Agent | 0.5 g | 0.7 g |
| KODAK Sodium Sulfite (Anhydrous) | 40.0 g | 70.0 g |
| KODAK Hydroquinone | 3.0 g | 11.0 g |
| KODAK Sodium Carbonate (Monohydrated) | 20.0 g | 20.0 g |
| KODAK Potassium Bromide (Anhydrous) | 2.0 g | 0.15 g |
| or Sodium Bromide | 1.75 g | 0.13 g |
| KODAK Sodium Hydroxide | — | 2.0 g |
| Water to make | 1.00 L | 1.00 L |
| pH at 80.6° F. (27° C.) | 10.15 ± 0.05 | 10.25 ± 0.05 |
| Specific Gravity at 80.6° F. (27° C.) | 1.052 ± 0.003 | 1.083 ± 0.003 |

*Both Quadrofos and Calgon (Calgon, Inc.) are sequestering agents.
**May need to be adjusted, depending on water condition.

In order to be able to produce desirably high maximum densities with conventional exposure and processing, the sound recording film of the invention also is preferably spectrally sensitized so as to require less than 1.9 erg/cm$^2$, more preferably less than 1.7 erg/cm$^2$, and most preferably less than 1.6 erg/cm$^2$ of energy at wavelengths of 580 nm and 670 nm, and more preferably for all wavelengths throughout the green and red regions of the electromagnetic spectrum, to produce a visual density of 3.75 after exposure and standard processing in the D-97 process.

It is further preferable that the sound recording film of the invention be substantially panchromatically sensitive from about 400 nm to at least 670 nm across the visible spectrum, so as to be able to be used with any wavelength exposing source within such range. Blue sensitizing dyes may be used along with green and red dyes to provide pansensitization, or an inately blue sensitive emulsion may be used along with a green and red sensitizing dye or dyes, or combinations of individually spectrally sensitized emulsions and inately sensitized emulsions may be used. For the purposes of this invention, a sound recording film is said to be substantially panchromatically sensitive across a wavelength range when it satisfies the above energy requirements to produce a density of 0.4 for all wavelengths within the range. Such panchromatically sensitive films also preferably satisfy the above energy requirements to produce a density of 3.75 for all wavelengths within the range.

Suitable vehicles for the emulsion layer and other layers of elements of this invention include hydrophilic colloids such as described in *Research Disclosure*, Item 308119, Section IX and the publications cited therein. In preferred embodiments of the invention, the hydrophilic colloid is gelatin. This may be any gelatin or modified gelatin such as acetylated gelatin, phthalated gelatin, oxidized gelatin, etc. Gelatin may be base-processed, such as lime-processed gelatin, or may be acid-processed, such as acid processed ossein gelatin. The hydrophilic colloid may be another water-soluble polymer or copolymer including, but not limited to poly(vinyl alcohol), partially hydrolyzed poly (vinylacetate/vinylalcohol), hydroxyethyl cellulose, poly (acrylic acid), poly(1-vinylpyrrolidone), poly(sodium styrene sulfonate), poly(2-acrylamido-2-methane sulfonic acid), polyacrylamide. Copolymers of these polymers with hydrophobic monomers may also be used.

The photographic elements can contain brighteners (*Research Disclosure*, Section V), antifoggants and stabilizers such as mercaptoazoles (for example, 1-(3-ureidophenyl)-5-mercaptotetrazole), azolium salts (for example, 3-methylbenzothiazolium tetrafluoroborate), thiosulfonate salts (for example, p-toluene thiosulfonate potassium salt), tetraazaindenes (for example, 4-hydroxy-6-methyl-1,3,3a,7-tetraazaindene), and those described in *Research Disclosure*, Section VI, anti stain agents and image dye stabilizers (*Research Disclosure*, Section VII, paragraphs I and J), light absorbing and scattering materials (*Research Disclosure*, Section VIII), hardeners (*Research Disclosure*, Section X), polyalkyleneoxide and other surfactants as described in U.S. Pat. No. 5,236,817, coating aids (*Research Disclosure*, Section XI), plasticizers and lubricants (*Research Disclosure*, Section XII), anti static agents (*Research Disclosure*, Section XIII), matting agents (*Research Disclosure*, Section XII and XVI) and development modifiers (*Research Disclosure*, Section XXI.

In addition to the silver halide emulsion layer, the sound recording film used in accordance with the invention may include further features and layers as are generally known in the photographic art. For example, an antistatic layer may be included on either side of the support, along with additional conventional interlayers and overcoat layers. Preferred supports for the films comprise transparent polymeric films, such as cellulose nitrate and cellulose esters (such as cellulose triacetate and diacetate), polycarbonate, and polyesters of dibasic aromatic carboxylic acids with divalent alcohols such as poly(ethylene terephthalate).

In a preferred embodiment of the invention, an antistatic layer is coated on the backside of the film support opposite to the silver halide emulsion layer. Any antistatic materials such as those previously suggested for use with photographic elements may be used. Such materials include, e.g., ionic polymers, electronic conducting non-ionic polymers, and metal halides or metal oxides in polymer binders.

Conductive fine particles of crystalline metal oxides dispersed with a polymeric binder have been used to prepare optically transparent, humidity insensitive, antistatic layers for various imaging applications. Many different metal oxides, such as AnO, $TiO_2$, $ZrO_2$, $Al_2O_3$, $SiO_2$, MgO, BaO, $MoO_3$, and $V_2O_5$, are disclosed as useful as antistatic agents in photographic elements or as conductive agents in electrostatographic elements in such patents as U.S. Pat. Nos. 4,275,103; 4,394,441; 4,416,963; 4,418,141; 4,431,764; 4,495,276; 4,571,361; 4,999,276; and 5,122,445, the disclosures of which are hereby incorporated by reference. Preferred metal oxides are antimony doped tin oxide, aluminum doped zinc oxide, and niobium doped titanium oxide, as these oxides have been found to provide acceptable performance characteristics in demanding environments. Particular preferred metal oxides for use in this invention are antimony-doped tin oxide and vanadium pentoxide which provide good resistance to static discharge.

An overcoat layer is preferably provided over the silver halide emulsion layer(s) of the sound recording film of the invention. Such overcoat may include lubricants and matting agents to minimize scratch susceptibility ot the sound negative to scratches and handling damage that may impact the digital decoding processes described in the art which require digital error correction or swithing to analog tracks for continuous sound playback. A diverse variety of lubricants can be used to provide appropriate lubricity. Preferred lubricates include those synthesized via the transesterification of methyl myristrate, methyl palmitate, methyl stearate, diethylene glycol and/or triethylene glycol, and commercially available silicon based lubricants such as Dow Corning 200, preferably as a mixture with Tergitol 15-S-5 or Synthetic Spermafol. The preferred range of active ingredient for best preventing handling scratches that may impact the decoding of digital audio sound tracks is from about 0.2 to 1 $mg/m^2$ in the overcoat layer. Such active ingredients are preferably coated in a hydrophilic colloid layer, such as a gelatin overcoat layer. The silver halide and overcoat layers are preferably hardened with conventional gelatin hardeners.

If desired, the recording films can be used in conjunction with an applied magnetic layer as described in U.S. Pat. Nos. 4,279,945 and 4,302,523 and *Research Disclosure*, November 1992, Item 34390 published by Kenneth Mason Publications, Ltd., Dudley House, 12 North Street, Emsworth, Hampshire P010 7DQ, ENGLAND.

In accordance with the invention, multiple digital soundtracks may be recorded using substantially monochromatic exposing devices such as lasers or light emitting diodes operating at wavelengths both above and below 600 nm, as well analog soundtracks using a white light exposing source or one of the monochromatic light sources. Such exposures may be performed in accordance with conventional digital and analog recording equipment. Preferably, the various exposing devices may be arranged so that the sound recording film may be transported in a single loop in sequence through the recorders, and selectively exposed on different portions of the film through use of filters, masks, etc. The exposed sound negative may then be processed in a black and white developer solution, washed, fixed, and dried to form a silver archival negative record of the sound tracks, using a process as described in Kodak Publication H-24 referenced above. The sound negative may then be printed along with a motion picture visual negative on a motion picture print film, such as Eastman Color Print Film 5386.

In motion picture color printing, there are usually three records to record simultaneously in the image area frame region of a print film, i.e., red, green and blue. The original image record to be reproduced is preferably an image composed of sub-records having radiation patterns in different regions of the spectrum. Typically it will be a multicolor record composed of sub-records formed from cyan, magenta and yellow dyes. The principle by which such materials form a color image are described in James, The Theory of the Photographic Process, Chapter 12, Principles and Chemistry of Color Photography, pp 335–372, 1977, Macmillan Publishing Co. New York, and suitable materials useful to form original records are described in *Research Disclosure* referenced above. Materials in which such images are formed can be exposed to an original scene in a camera, or can be duplicates formed from such camera origination materials, such as records formed in color negative intermediate films such as those identified by the tradenames Eastman Color Intermediate Films 2244, 5244 and 7244. The peak absorptions for such films are typically in the blue region of the spectrum at about 440 nm, in the green region of the spectrum at about 540 nm, and in the red region of the spectrum at about 680 nm.

Motion picture color print films typically comprise a support bearing light sensitive yellow, magenta, and cyan dye forming layers sensitized respectively to the blue (approx. 380–500 nm), green (approx. 500–600 nm), and red (approx. 600–760 nm) regions of the electromagnetic spectrum. Such materials are described in the *Research Disclosure* publications cited above. Such light sensitive materials may also be sensitive to one or more regions of the electromagnetic spectrum outside the visible, such as the infra red region of the spectrum. In most color photographic systems, color-forming couplers are incorporated in the light-sensitive photographic emulsion layers so that during development, it is available in the emulsion layer to react with the color developing agent that is oxidized by silver image development. Diffusible couplers are used in color developer solutions. Non-diffusing couplers are incorporated in photographic emulsion layers. When the dye image formed is to be used in situ, couplers are selected which form non-diffusing dyes. Color photographic systems can also be used to produce black-and-white images from non-diffusing couplers as described by Edwards et al in International Publication No. WO 93/012465.

Soundtracks may be formed in color motion picture print film in accordance with conventional print film exposing and development processing. Such soundtracks may comprise dye images and/or silver images. Soundtracks comprising dye images may be formed in multiple photosensitive emulsion layers of the motion picture film, or may be restricted to a single emulsion layer as set forth in U.S. Pat. No. 2,176,303. However, as common sound systems for reading analog soundtracks incorporate a photodiode in the projector whose radiant sensitivity peaks at approximately 800–950 nm (depending on the type of photodiode), which detects the predominant infra-red (IR) radiation emitted by common tungsten lamps, in order to provide effective modulation of common projector soundtrack illumination light, motion picture print film is typically processed according to a system wherein the optical analog soundtrack area of the print film is developed differently from the picture image frame area so that a silver image is left in the soundtrack area of the film, whereas all the silver is removed in the picture frame area, leaving only a dye image. The silver image may be reformed selectively in the soundtrack area of the film through selective application of a second developer solution after initial uniform color development (which develops exposed silver halide in both the picture area and soundtrack area up to silver metal and generates image dye), stop bath and fixer (arrests development and removes undeveloped silver halide), and bleach (converts exposed, developed silver back to silver halide in both the picture area and soundtrack area) steps. The second development step typically comprises application of a thick, viscous solution of a conventional black and white developer with a cellulose compound such as nitrosyl in a stripe solely onto the soundtrack area of the film, causing the silver halide in the soundtrack area to be selectively developed back into silver metal, while not affecting the silver halide in the image area. A subsequent fixing step then removes the silver halide from the image area, while leaving a silver image corresponding to the soundtrack exposure. Processing of motion picture print film is described, e.g., for the Kodak ECP-2B Process, in Kodak Publication No. H-24, Manual For Processing Eastman Color Films, referenced above. Various other techniques are also known for retaining silver in the soundtrack area, e.g., as set forth in U.S. Pat. Nos. 2,220,178, 2,341,508, 2,763,550, 3,243,295, 3,705,799, 4,139,382.

Use of the sound recording films of the invention may be used to form either silver soundtracks or silverless dye soundtracks as described above for use in combination with appropriate decoding apparatus. For improved performance for dye-only soundtracks, it is preferable to record and developing the soundtrack in a single photosensitive layer of the print film, and recover the signal from the dye only soundtrack using a narrow band (e.g., 10–30 nm bandwidth) light source the wavelength of which is chosen so as to coincide with the peak absorbance wavelength of the soundtrack dye. Where the cyan layer of the print film is used to record the soundtrack, e.g., a narrow band red light source would be used for reading the developed soundtrack. A red light emitting diode may be conveniently used for reading cyan dye-only soundtracks, e.g., as has been recently proposed by Dolby Laboratories in an announcement at the Association of Cinema and Video Laboratories (ACVL) Jun. 1–3, 1995 convention at Lake Tahoe, Nev. The use of such relatively monochromatic light sources for the soundtrack reader in combination with a single layer dye soundtrack maximizes the relative optical density difference between the dyed areas and the undyed transparent areas of the soundtrack while maintaining high contrast. While a conventional tungsten light source may perform poorly with a dye only soundtrack due to the relatively low signal generated in the solar cell of the soundtrack reader resulting from the poor modulation of the tungsten light by the image dyes, the use of a narrow monochromatic light source eliminates the presence of unmodulated light outside the absorbance spectrum of the dye only soundtrack striking the solar cell, thereby improving the modulation signal generated by the solar cell.

EXAMPLES

A cubical bromoiodide emulsion was prepared with a bromide:iodide halide ratio of 97:3 and a median grain size of 0.28 micons and a standard deviation of 0.095 as estimated with a disc centrifuge particle sizing method using a monomodal logarithmic normal equation (Coefficient of Variation 34%). The emulsion was chemically sensitized with sodium aurous dithiosulfate dihydrate at 0.059 g/mole of silver, potassium selenocyanate at 0.0028 kg/mole of silver, and sodium thiosulfate pentahydrate at 13.2 g/mole of silver. The emulsion was then optically sensitized with green spectral sensitizing dye GSD-1 at 0.089 g/ mole silver (peak sensitivity 580 nm), green spectral sensitizing dye GSD-2 at 0.178 g/ mole silver (peak sensitivity 550 nm), and red spectral sensitizing dye RSD-1 at 0.060 g/ mole silver (peak sensitivity 670 nm).

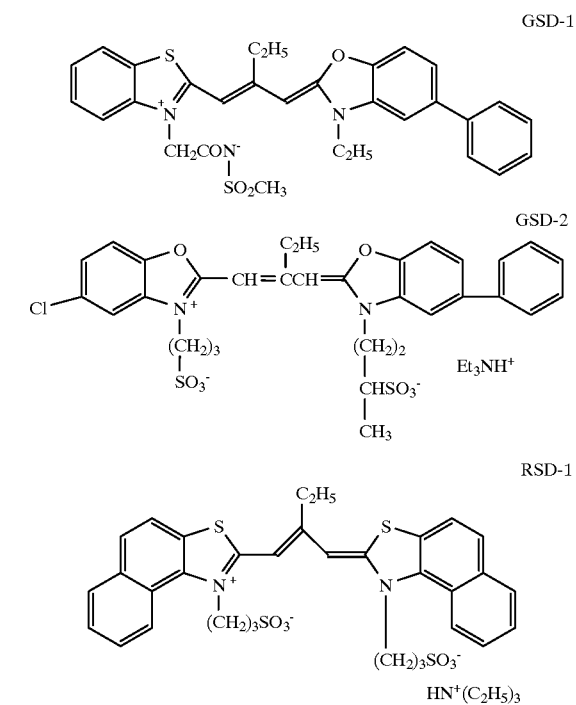

A photosensitive emulsion layer comprising this silver halide emulsion, gelatin at 3650 mg/ sq meter, saponin at 40.9 mg/sq meter, 1-3 Acetamidophenyl-5-mercaptotetrazole at 5.5 mg/sq meter and 4- hydroxy-6-methyl1,3 tetraazaindene at 7.5 mg/sq meter was coated at a 2660.0 mg/sq meter silver laydown on a 4.7 mil poly (ethylene terphthalate) base. An overcoat layer was coated above the emulsion containing layer comprising gelatin at a 888.0 mg/sq meter laydown, polymethymethacrylate matte beads at 18.0 mg/sq meter, lubricant Dow Corning 200 fluid at 29.9 mg/sq meter, and surfactants Lodyne S-100 at 7.89 mg/sq meter, Duponal ME at 1.97 mg/sq meter and T2E at 96.65 mg/sq meter.

The coated film was exposed with three exposing conditions to evaluate the sensitometric charecteristics. The definition of each exposing condition is listed in Table 1, all exposure were made through a 21 step tablet having a density range of 0-3.0 and 0.15 step increments, and the Ref Log E is at the mid (11th) step of the tablet.

TABLE 1

|  | Exposure 1 | Exposure 2 | Exposure 3 |
| --- | --- | --- | --- |
| Illuminant Type: | Tungsten White Light (Color temp 2850 K) | Xenon with 580 nm Bandpass filter | Tungsten 650 nm Bandpass filter |
| Additional Filter: | 0.40 Neutral Density |  |  |
| Exposure Time: | 1000 μsec | 100 μsec | 1000 μsec |
| Ref Log E: | 0.00 | −0.2800 | 0.7180 |

Each exposure was then processed in the standard D-97 development process as specified in the Kodak Publication H-24 titled "Manual for Processing Eastman Motion Picture Film Module 15". The basic process conditions are provided in Table 2.

TABLE 2

| Process Sequence | Time (Min) | Temperature (° C.) |
| --- | --- | --- |
| 1. Developer | 4:00 | 23.9 ± 0.3 |
| 2. Stop | 0:30 | 23.9 ± 0.3 |
| 3. Fixer | 4:00 | 23.9 ± 0.3 |
| 4. Dry | 8:00 | 35 |

The resulting sensitometric parameters are provided in Table 3, where Dmin and Dmax are the minimum and maximum densities of the films after development, Speed is defined as 100(1-logE) at a density of 2.5, and OG (overall gradient) is defined as the slope of the straight line portion of the D logE characteristic curve between 0.3 and 2.3 above Dmin.

TABLE 3

| Exposing Source | Sensitometric Parameters | | | |
| --- | --- | --- | --- | --- |
|  | Dmin | Speed | OG | Dmax |
| Exposure 1. | 0.24 | 135 | 4.15 | 4.15 |
| Exposure 2. | 0.24 | 120 | 4.35 | 4.15 |
| Exposure 3. | 0.24 | 105 | 3.92 | 4.15 |

The film was also exposed as defined for Exposure 2 in Table 1, except using 580 nm and 650 nm bandpass filters to determine the radiation energy needed to produce 0.40 and 3.75 visual densities. Each exposure was processed as defined in Table 2. The energy level requirement expressed in terms of erg/cm$^2$ are summarized in table 4.

TABLE 4

| Exposure Bandpass Filter | Energy to produce density of 0.40 | Energy to produce density of 3.75 |
| --- | --- | --- |
| 580 nm | 0.180 | 1.41 |
| 650 nm | 0.189 | 1.52 |

The above results demonstrate this film meets sensitivity requirements for recording digital soundtracks with both red and green monochromatic light sources.

The film was also exposed from 400 nm to 670 nm in 10 nm increments to assess the spectral sensitivity of the film in a general way. The relative spectral sensitivity of the film is illustrated in FIG. 1, where sensitivity is defined as the reciprocal of exposure (erg/cm$^2$) required to produce a particular density. While relative sensitivity results are indicated in FIG. 1, it is apparent in combination with the absolute sensitivity data presented above that the film is substantially panchromatically sensitive over a range of spectral wavelengths from 400 nm to 670 nm and is capable of accurately reproducing exposures from digital sound recording devices operating at any monochromatic wavelength within such range as well as analog soundtracks exposed with white light.

The reciprocity characteristics of the film were were evaluated by varying exposure times from $10^{-3}$ to $10^{-4}$ seconds using a 580 nm bandpass filter. Speed was calculated as in Table 3, and Speed values were normalized from the 100 microsecond ($10^{-4}$ sec) exposure time. The resulting data are presented in Table 5.

TABLE 5

| Exposure: (sec) | $10^{-4}$ | $4 \times 10^{-4}$ | $6 \times 10^{-4}$ | $10^{-3}$ |
| --- | --- | --- | --- | --- |
| Speed Delta: | 0 | -4 | 1 | 3 |

The above data demonstrates that over the range of typical exposure times found in equipment used for both analog and digital applications, this film is acceptable for both analog (longer exposure times) and digital (shorter exposure times) applications.

This invention has been described in detail with particular reference to preferred embodiments thereof. It will be understood that variations and modifications can be made within the spirit and scope of the invention.

We claim:

1. A black and white silver halide motion picture sound recording film comprising a support bearing at least one silver halide emulsion layer comprising monodispersed silver halide grains having an average grain size of less than 0.35 microns and a coefficient of variation of grain size of less than 55%, wherein the contrast overall gradient of the film is greater than 3.7, wherein the overall gradient is defined as the slope of the straight line portion of a D logE characteristic curve between 0.3 and 2.3 above minimum density obtained upon tungsten white light exposure and standard processing in a D-97 process comprising a 4 minute developer step at 23.9±0.3° C. with standard Kodak D-97 Developer as specified in the Kodak Publication H-24, a wash or stop step, and a fixer step, and wherein said film is spectrally sensitized with a first sensitizing dye providing a peak sensitivity at less than or equal to 600 nm and a second sensitizing dye providing a peak sensitivity above 600 nm.

2. A sound recording film according to claim 1, wherein said film comprises a silver halide emulsion comprising silver halide grains having an average grain size of less than 0.31 microns.

3. A sound recording film according to claim 1, wherein said film comprises a silver halide emulsion comprising silver halide grains having an average grain size of less than 0.29 microns.

4. A sound recording film according to claim 1, wherein said film is substantially panchromatically sensitized over a wavelength range of 400 nm to 670 nm.

5. A sound recording film according to claim 1, wherein said film is spectrally sensitized so as to require less than 1.9 erg/cm$^2$ of energy at wavelengths of 580 nm and 670 nm to produce a visual density of 3.75 after exposure and standard processing in the D-97 process as specified in the Kodak Publication H-24.

6. A sound recording film according to claim 1, wherein said film has a reciprocity speed differential of less than 0.25 logE over a range of exposure times from $10^{-3}$ to $10^{-4}$ second, wherein the reciprocity speed differential is measured at a density of 2.5.

7. A sound recording film according to claim 1, wherein said film is spectrally sensitized with a green spectral sensitizing dye and a red spectral sensitizing dyes.

8. A sound recording film according to claim 1, wherein said film exhibits a maximum density of at least 3.7 after exposure with white light, 580 nm light, or 670 nm light and standard processing in the D-97 process as specified in the Kodak Publication H-24.

9. A sound recording film according to claim 1, wherein the contrast overall gradient of the film is greater than 3.8.

10. A sound recording film according to claim 1, wherein the contrast overall gradient of the film is greater than 3.9.

* * * * *